United States Patent
Vauchel et al.

(10) Patent No.: US 8,919,668 B2
(45) Date of Patent: Dec. 30, 2014

(54) THRUST REVERSER HAVING A LOCKABLE VARIABLE NOZZLE SECTION

(71) Applicant: Aircelle, Gonfreville l'Orcher (FR)

(72) Inventors: Guy Bernard Vauchel, Harfleur (FR); Jean-Philipe Joret, Beuzeville (FR); Loïc Le Boulicuat, Le Havre (FR); Philippe Avenel, Sainte Adresse (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/741,868

(22) Filed: Jan. 15, 2013

(65) Prior Publication Data
US 2013/0292489 A1    Nov. 7, 2013

Related U.S. Application Data

(63) Continuation of application No. PCT/FR2011/051151, filed on May 20, 2011.

(30) Foreign Application Priority Data

Jun. 3, 2010   (FR) .................................... 10 54324

(51) Int. Cl.
| | |
|---|---|
| *B63H 11/00* | (2006.01) |
| *B63H 11/10* | (2006.01) |
| *B64D 33/04* | (2006.01) |
| *F02K 1/00* | (2006.01) |
| *F02K 3/02* | (2006.01) |
| *F02K 1/62* | (2006.01) |
| *F02K 1/09* | (2006.01) |
| *F02K 1/72* | (2006.01) |
| *F02K 1/76* | (2006.01) |

(52) U.S. Cl.
CPC ... *F02K 1/62* (2013.01); *F02K 1/09* (2013.01); *F02K 1/72* (2013.01); *F02K 1/763* (2013.01); *F02K 1/766* (2013.01); *Y02T 50/671* (2013.01)
USPC ............ 239/265.19; 239/265.11; 239/265.33; 60/226.2; 60/230

(58) Field of Classification Search
USPC ............. 239/265.11, 265.19, 265.23, 265.33; 60/226.2, 230
See application file for complete search history.

(56) References Cited

U.S. PATENT DOCUMENTS

| | | | |
|---|---|---|---|
| 3,797,785 A | | 3/1974 | Baerresen et al. |
| 4,922,713 A | * | 5/1990 | Barbarin et al. ............. 60/226.2 |
| 5,720,449 A | | 2/1998 | Laboure et al. |
| 6,021,636 A | * | 2/2000 | Johnson et al. ............. 60/226.2 |
| 6,045,091 A | * | 4/2000 | Baudu et al. ............. 244/110 B |

FOREIGN PATENT DOCUMENTS

| | | |
|---|---|---|
| EP | 1457660 | 9/2004 |
| FR | 2358555 | 2/1978 |
| FR | 2622929 | 5/1989 |

OTHER PUBLICATIONS

I PCT/FR2011/051151 International Search Report.

* cited by examiner

*Primary Examiner* — Phutthiwat Wongwian
*Assistant Examiner* — Arun Goyal
(74) *Attorney, Agent, or Firm* — Brinks Gilson & Lione

(57) ABSTRACT

The present disclosure relates to a thrust reverser including at least one translatably movable cowl capable of alternately shifting between a closed position in which same ensures the aerodynamic continuity of the nacelle and which covers the deflecting means, and an open position in which same opens a passage in the nacelle and uncovers the deflecting means, said thrust reverser likewise including at least one variable nozzle section arranged in the extension of the movable thrust-reversing cowl and provided with at least one locking means capable of engaging with a complementary locking means of the movable reversing cowl so as to optionally mechanically link the movable nozzle section of the movable reversing cowl.

10 Claims, 2 Drawing Sheets

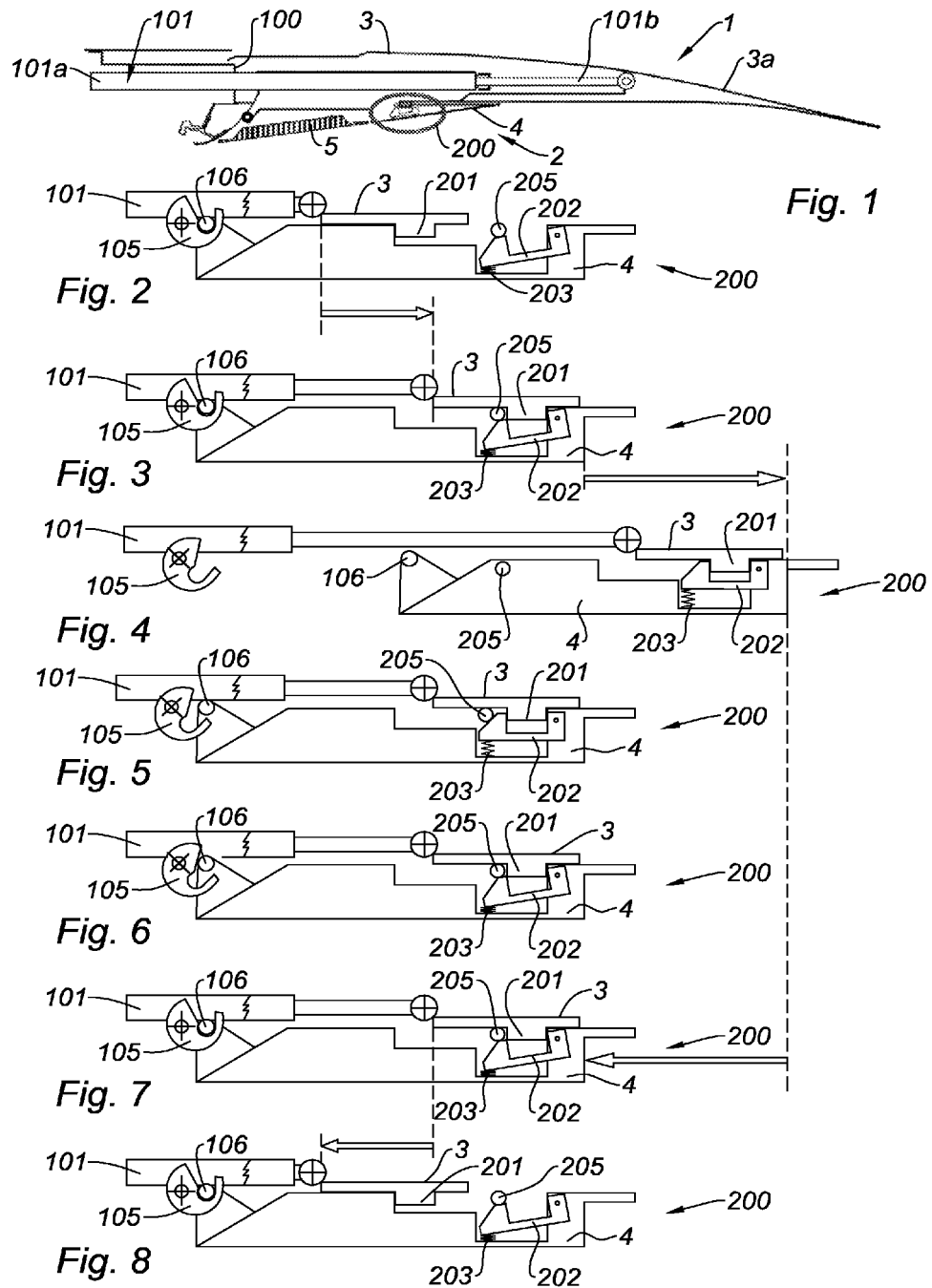

US 8,919,668 B2

THRUST REVERSER HAVING A LOCKABLE VARIABLE NOZZLE SECTION

CROSS-REFERENCE TO RELATED APPLICATIONS

This application is a continuation of International Application No. PCT/FR2011/051151 filed on May 20, 2011, which claims the benefit of FR 10/54324, filed on Jun. 3, 2010. The disclosures of the above applications are incorporated herein by reference.

FIELD

The present disclosure relates to a nacelle for an aircraft engine, equipped with a thrust reversal device extended with a nozzle device with variable section.

BACKGROUND

The statements in this section merely provide background information related to the present disclosure and may not constitute prior art.

An airplane is driven by several turbine engines each accommodated in a nacelle used for channeling the airflows generated by the turbine engine which also harbors a set of ancillary actuation devices related to its operations and ensuring diverse functions when the turbine engine is operating or at a standstill.

These ancillary actuation devices notably comprise a mechanical system for thrust reversal and a variable nozzle system.

A nacelle generally has a tubular structure comprising an air intake upstream from the turbine engine, a middle section intended to surround a fan of the turbine engine, a downstream section harboring thrust reversal means and intended to surround the combustion chamber of the turbine engine, and it is generally completed with an ejection nozzle, the outlet of which is located downstream from the turbine engine.

Modern nacelles are intended to harbor a dual flow turbine engine capable of generating via the rotating blades of the fan a flow of hot air (also called primary flow) from the combustion chamber of the turbine engine, and a cold air flow (secondary flow) which circulates outside the turbine engine through an annular passage, also called a vein, formed between a fairing of the turbine engine and an internal wall of the nacelle. Both air flows are ejected from the turbine engine through the rear of the nacelle.

The role of a thrust reverser during the landing of an airplane is to improve the braking capability of the latter by redirecting forwards at least one portion of the thrust generated by the turbine engine. In this phase, the reverser shuts off the vein of the cold flow and directs the latter towards the front of the nacelle, thereby generating a counter thrust which will be added to the braking of the wheels of the airplane.

The means applied for achieving this reorientation of the cold flow vary according to the reverser type. However, in all cases, the structure of a reverser comprises movable cowls which may be displaced between a deployed position in which they open in the nacelle a passage intended for the deflected flow on the one hand, and a retracted position in which they close this passage on the other hand. These cowls may fulfill a deflection function or a function simply for activating other deflection means.

In the case of a reverser with grids, also known as a cascade reverser, the reorientation of the air flow is carried out by deflection grids, the cowl only having a simple sliding function aiming at uncovering or covering these grids, the translation of the movable cowl being carried out along a longitudinal axis substantially parallel to the axis of the nacelle. Additional blocking gates, activated by the sliding of the cowling, generally allows the vein to be closed downstream from the grids so as to optimize the reorientation of the cold flow.

In addition to its thrust reversal function, the sliding cowl belongs to the rear section and has a downstream side forming an ejection nozzle aiming at channeling the ejection of the air flows. This nozzle may be an addition to a primary nozzle channeling the hot flow and is then called a secondary nozzle.

The performances of thrust reversal are satisfactorily obtained with the known devices. However, for reasons of aerodynamic optimization, and consequently optimization of fuel consumption, it is quite advantageous to be able to adjust the section of the outlet for the cold air flow downstream from the nacelle: it is indeed useful to be able to increase this section during take-off and landing phases, and to reduce it during cruising phases: this is often referred to as an adaptive nozzle, or else further as a "VFN" (Variable Fan Nozzle).

Such a system is described in document FR 2 622 929 or further FR 2 902 839 for example.

These documents describe the application of thrust reversers with grids, equipped with a variable ejection section and to do this provides a movable cowl comprising two portions which may be connected together with locking means.

According to the embodiments, the variable nozzle may be made from one or several dedicated movable elements, such as pivoting flaps or a translatable cowl portion or this function may be fulfilled by the movable cowl itself by low amplitude translational movements not activating the thrust reversal function.

For an extensive and detailed description of different embodiments, reference may be made to documents FR 2 922 058, FR 2 902 839, FR 2 922 059, inter alia.

The operating phases of the variable nozzle and of the thrust reverser are distinct. The variable nozzle can only operate when the reverser is actuated upon landing. Vice versa, the thrust reverser should not operate when the variable nozzle section is maneuvering.

Moreover, the adaptive nozzle is located in the downstream extension of the thrust reversal cowl, and it is important to be able to actuate both of these portions of the nacelle independently; in particular the intention is to be able to increase the section of the adaptive nozzle without actuating the thrust reversal means, in particular during take-off.

In order to achieve this independent actuation, each movable portion (reverser/nozzle) may conventionally be equipped with its own actuator (two single rod actuators or a dual rod actuator cylinder, for example) and be driven independently.

In order to make the driving assembly lighter, it is possible to use a simple single-rod actuator, by providing additional locking means between the movable portions.

Such a solution and a few application principles are shown in document FR 2 902 839, notably in FIGS. 13 to 15.

SUMMARY

The present disclosure is directed to a locking system between a movable reverser portion and a movable nozzle portion for actuation by means of at least one single-rod cylinder.

It should be noted that although more particularly intended for an actuation system with a single-rod cylinder, the invention is not limited to this type of driving means and is independent of this, the locking of both movable structures together may be used with other types of driving means and may further form an additional defense line in certain cases.

The present disclosure relates to a thrust reverser for a turbine engine nacelle comprising means for deflecting at least one portion of an air flow of the turbine engine on the one hand, and at least one translationally movable cowl along a substantially longitudinal direction of the nacelle capable of alternately passing from a closed position in which it ensures aerodynamic continuity of the nacelle and covers the deflection means, and an opening position in which it opens a passage in the nacelle and uncovers the deflection means on the other hand, said thrust reverser also comprising at least one variable nozzle section arranged in the extension of the thrust movable reversing cowl and equipped with at least one locking means capable of cooperating with an additional locking means of the movable reversing cowl so as to mechanically link the movable nozzle section to the movable reversing cowl or not, characterized in that the locking means and the additional locking means comprise at least one locking ratchet movably mounted against an elastic return means between an engagement position in which it firmly attaches the drive of the nozzle section and of the reversal cowl, and a disengagement position in which it releases the drive of said nozzle section and of said reversal cowl, the elastic return means tending to bring the ratchet back into its engagement position, said ratchet being maintained in a disengagement position via at least one pin mounted on the fixed structure of the reverser.

Thus, by providing a locking system activated by a pin, a simple, reliable and efficient mechanical locking system is made available, not requiring complex linkages, and with which it is possible to meet the requirements mentioned above.

It should be noted that according to certain embodiments, the reversal function and the movable nozzle function may be fulfilled by a same external movable cowl, with low amplitude displacements ensuring the nozzle section variation, while a large amplitude displacement will activate the reversal function. This is notably the case in document FR 2 902 839.

In such a form, the locking is then carried out with a movable interior portion only open during the operation in the reverser mode. The term of movable reversing cowl should then be understood with broad acceptance designating a moveable portion only activated in the reverser mode.

Advantageously, the pin is movably mounted between a position for maintaining the movable ratchet and a set back position, the passing from one position to the other being associated with a locking or unlocking situation of the movable reversing cowl on the fixed structure.

Advantageously, the device comprises a means for detecting the end of the closing of the movable reversing cowl.

In one form, the thrust reverser comprises at least one single rod cylinder having a first end mounted on the fixed structure and a second driving end, linked to the movable nozzle section.

In another form, the fixed structure on which the pin is mounted, is a longitudinal beam, and more particularly a so called twelve o'clock beam.

In another form, the movable reversing cowl is equipped with at least one locking means with a fixed structure of the reverser, notably a front frame.

Still in another form, the locking means are located in an upstream portion of the movable reversing cowl.

Advantageously, the locking means of the movable reversing cowl and/or of the movable nozzle are mounted on a guiding structure of said movable reversing cowl and/or nozzle.

In one form, the locking means comprises at least one jointed or sliding abutment, preferably located substantially in the center of a section of the corresponding guiding structure if necessary.

Advantageously, the locking system is located in an upper portion but may also be located in a lower portion.

Still advantageously, at least one guiding rail of the variable nozzle is in abutment downstream in a guiding rail of the reversal cowl, with a functional maneuvering play of the abutment on the blocking nozzle structure being provided.

The present disclosure also relates to a turbine engine nacelle characterized in that it comprises at least one thrust reverser according to the invention.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a general longitudinal sectional view of a thrust reversal device according to the disclosure;

FIGS. 2 to 8 schematically illustrate the different operating steps of the thrust reverser of FIG. 1;

FIGS. 9 and 10 schematically illustrate an alternative embodiment of the thrust reverser of FIG. 1, the locking system being equipped with a movable pin; and FIGS. 11 and 12 schematically illustrate a second alternative form of the thrust reverser of FIG. 1, the locking system being equipped with a movable pin associated with an end-of-travel detector.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a general longitudinal sectional view of a thrust reversal device 1 according to the invention, as notably described in document FR 2 902 839.

The thrust reversal device 1 belongs to the rear section of a nacelle (not shown) of a turbine engine, is mounted on a front frame 100. The rear section defines with an internal bearing structure of the turbine engine, a vein 2 for circulation of a secondary air flow.

The thrust reversal device comprises a translationally movable cowl 3 along a substantially longitudinal direction of the nacelle capable of being translationally driven by a single rod actuator cylinder 101 so as to alternately pass from a closing position (FIG. 1) in which it harbors deflection grids (not visible) and ensures structural and aerodynamic continuity of the nacelle, the secondary flow then being ejected directly through the vein 2, to an opening position in which it uncovers said deflection grids, then opening a passage in the nacelle, an internal panel 4 also mounted so as to be translationally movable, causing the pivoting of blocking flaps 5 which will shut off totally or partly the vein 2 so as to force ejection of a secondary flow through the deflection grids substantially towards the front of the nacelle in order to generate a counter thrust.

The single rod cylinder 101 has a base 101a mounted on the front frame, fixed, and a movable end 101b, linked to the cowl 3 to be moved.

Moreover, the movable cowl 3 has a downstream end 3a able to be used as a variable nozzle section.

To do this, in addition to the large amplitude translations (maximum deployed cylinder 101) allowing clearing of the deflection grids and activation of the thrust reversal function, said movable cowl 3 performs low amplitude displacements, not causing clearing of the deflection grids or opening of the nacelle.

Thus, it is understood that in the case of operating in thrust reverser mode, the movable cowl 3 and the internal panel 4 have to perform translation upstream from the nacelle in a large amplitude movement while in the case of operating in a variable nozzle mode, only the movable cowl 3 moves according to reduced amplitude movements, the internal panel remaining fixed so as to ensure the internal fairing of the vein 2.

As discussed in document FR 2 902 839, removable locking means should then be provided between the movable cowl 3 and the internal panel 4.

Thus, in a thrust reversal mode, the movable cowl 3 and the internal panel 4 are locked together, the internal panel 4 then simultaneously performing a translational movement to the movable cowl 3, while in the variable nozzle mode, the movable cowl 3 and the internal panel 4 are unlocked, the movable cowl 3 can then no longer drive the internal panel 4 which remains motionless.

Moreover, the internal panel is itself locked on the front frame 100 when the thrust reversal function is deactivated. In this case, the locking is performed by means of a hook 105 capable of engaging with a corresponding locking finger 106.

The present disclosure thus provides a simple and reliable locking system as discussed earlier.

To do this, the thrust reversal device 1 is equipped with a locking system 200, the structure and the operation of which will now be described in detail.

The locking system 200 comprises a first locking means 201 belonging to the movable cowl 3 and capable of cooperating with an additional locking means 202 of the internal panel 4 so as to mechanically link the movable cowl 3 and the internal panel 4 or not, as explained above.

In this case, the locking means 201 appears as a dog and the additional locking means 202 appears as a ratchet capable of engaging with the dog when it is facing the latter. Quite obviously, the dog and the ratchet may be positioned vice versa on the internal panel 4 and the movable cowl 3, respectively.

The ratchet 202 is movably mounted against an elastic return means appearing as a spring 203 tending to force it towards its engagement position.

Finally, the locking system comprises a pin 205 mounted on a fixed structure of the reverser 1, notably for example, a twelve o'clock longitudinal holding beam (not visible) and along which the movable cowl 3 performs translation, said pin 205 being mounted so as to maintain the ratchet 202 in its position for disengaging the dog 201 against the spring 203.

FIGS. 2 to 8 illustrate the operation of the locking system during the diverse operating phases of the thrust reversal device.

FIG. 2 shows the locking system in the cruising position. In this flight configuration, only the variable nozzle is operational. The internal panel 4 is locked on the front frame 100 via the hook 105 engaged with the locking finger 106. The fixed pin 205 is located at the locking ratchet 202 and maintains it in the disengagement position against its spring 203. The dog 201, firmly attached to the movable nozzle cowl 3, freely moves under the effect of the actuation cylinder 101 in the variation range of the nozzle. The nozzle section is here reduced to a minimum, the dog coming into abutment against an upstream abutment.

FIG. 3 illustrates the opposite extreme position, i.e. the one in which the nozzle section is maximum, the dog 201 coming into abutment against a downstream abutment of the internal panel 4.

FIGS. 4 to 7 illustrate the passing into the thrust reversal mode.

Figure 9:
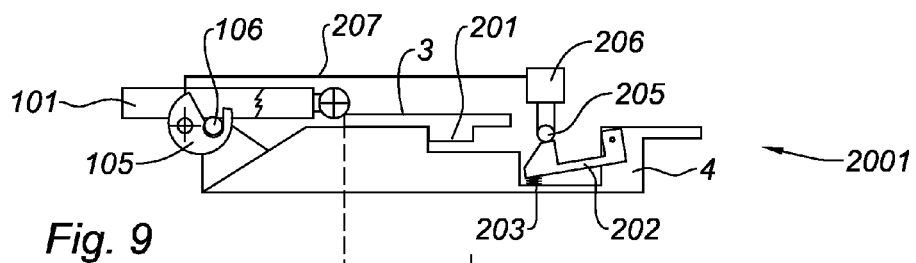

In this phase, the internal panel 4 is released from the front frame 100 by opening the hook 105. By doing this, the dog 201, still moving back under the effect of the cylinder 101, drives the internal panel 4. The ratchet 202 then moves away from the fixed pin 205 which no longer maintains it in an opening position against its spring 203. The ratchet 202 then switches to the locking position and will engage the dog 201, linking the internal panel 4 to the movable cowl 3, causing simultaneous displacement of both structures.

Thus, the movable cowl 3 opens the external passage in the nacelle and uncovers the deflection grids at the same time as the internal panel 4 moves back and opens the internal passage in the vein 2 for circulation of the secondary flow, which will also cause pivoting of the blocking flaps 5.

When the thrust reversal phase is completed, and the movable cowl 3 and the internal panel 4 are retracted in the closing position of the reverser, the ratchet 202, as illustrated in FIGS. 5 and 6, returns towards the pin 205 which will force its opening and cause disengagement of the ratchet 202 with the dog 201, thereby releasing the internal panel 4 from the movable cowl 3.

The end of the reversal phase is completed, as illustrated in FIG. 7, by the relocking of the internal panel 4 on the front frame 100 with the hook 105.

FIG. 8 shows the return to the cruising configuration, identical with FIG. 1.

Figure 10:
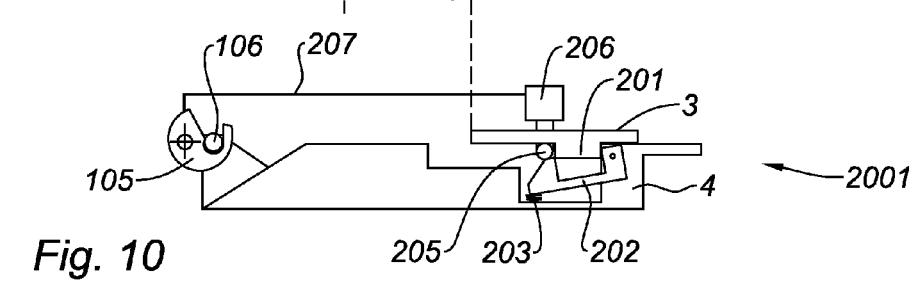

FIGS. 9 and 10 show a first alternative embodiment of the locking system in which the pin 205 is movably mounted on its fixed structure, and more specifically is retractable by means of a dedicated actuator 206.

This actuator 206 is driven in combination with the locking hook 105 on the front frame 100 by a control line 207.

Indeed, in the first form, it was seen that a short instant existed between the moment when the movable cowl 3 is in abutment downstream and initiates switching to the reversal phase, an instant during which the movable cowl 3 is not locked with the internal panel 4, the latter having to move beforehand slightly away from the non retractable fixed pin 205 so that the ratchet 202 may tilt and engage with the dog 201.

By means of a retractable 206 control pin 205, in combination with the hook 105, the pin 205 may be retracted, and consequently the movable cowl 3 and the internal panel 4 may be locked together, as soon as the hook 105 opens notifying the passing into the thrust reversal mode.

A localization of the locking system 2001 as most downstream as possible will advantageously be preferred in order to provide sufficient distance with the locking of the internal panel 4 on the front frame 100. Thus, in the case of bursting of a turbine vane, the pin 205 will be used as a third defense line, notably by providing an additional abutment belonging to the reversing structure, in this case, the internal panel 4, which, positioned upstream from the locking system, will prevent any unexpected maneuver as long as said pin 205 is not retracted.

The locking system 2001 may comprise additional position sensors giving the possibility of confirming the position of the different movable portions so as to ensure execution of the different maneuvers only when said movable portions are in the corresponding configurations in order to avoid any risk of deterioration of the parts.

Figure 11:
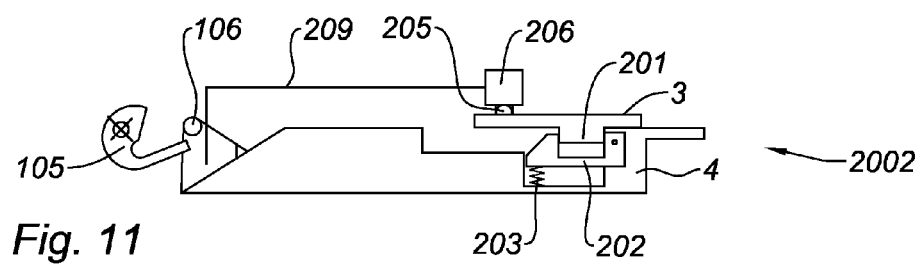
Figure 12:
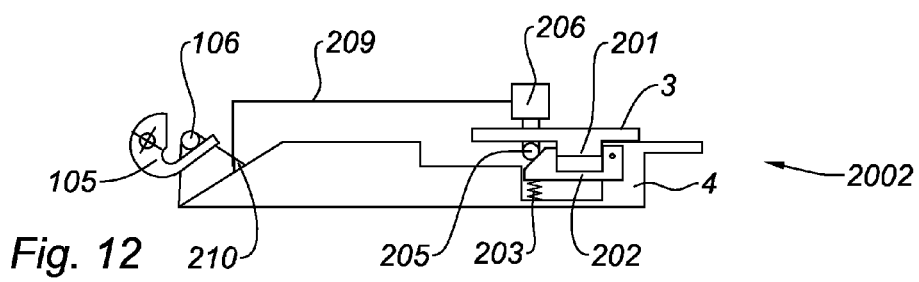

In a third form schematically illustrated in FIGS. 11 and 12, the locking system 2002 will comprise in addition to the retractable 206 pin 205, activation 209 by a closure end-of-travel detection means 210 (FIG. 12). This gives the possibility of obtaining an abutment for approaching a ramp of the ratchet 202 instead of using the pin 205 as a pusher for forcing the ratchet 202.

Indeed, in the second form, the retractable 206 pin 205 is a pushing pin. Further, it is driven by the locking system which has to take into account the risk of jamming in its dimensioning. This may lead to over dimensioning the system, which will have a negative impact on the cost and the mass of the assembly.

In this third form, the retractable 206 pin 205 may be used as a ramp and may be positioned in interference with the ratchet 202 before the latter comes into contact with it. It is then the cylinder 101 for driving the movable cowl 3 which causes the retractable pin 205 to retract. As the cylinder 101 is dimensioned for larger loads, this additional force is transparent for said cylinder 101. There is therefore no impact on the mass and the cost.

Thus, in a position close to the complete closing of the thrust reversal mode, the detection means 210 tells the locking system 2002 to deploy the pin 205. Said pin 205 is deployed before the ratchet 202 comes into contact with it. At the same time, the hook 105 for locking the internal panel 4 on the front frame 100 is engaged with the locking finger 106 so as to prevent any possible unexpected backward movement of the structure. Thus, FIG. 12 shows a transient position in which there no longer exists any movable structure, (movable cowl 3 and internal panel 4) which is not contained, complete disengagement of the ratchet 202 only being carried out when the locking hook 105 is totally engaged.

Although the invention has been described with a particular embodiment, it is by no means limited thereto and that it comprises all the technical equivalents of the described means as well as their combinations if the latter enter the scope of the invention.

What is claimed is:

1. A thrust reverser for a turbine engine nacelle comprising:
a cascade grid mounted to the nacelle and configured to deflect at least one portion of an airflow of the turbine engine, and;
at least one translationally movable cowl along a substantially longitudinal direction of the nacelle, the at least one translationally movable cowl capable of alternately passing from a closing position to an opening position, wherein in the closing position, said at least one translationally movable cowl provides an aerodynamic continuity of the nacelle and covers the cascade grid, and in the opening position, said at least one translationally movable cowl opens a passage in the nacelle and uncovers said cascade grid; and
an internal panel configured to translate along said longitudinal direction and causes blocking flaps to pivot, wherein said at least one translationally movable cowl comprises at least one variable nozzle section arranged in an extension of said at least one translationally movable cowl and wherein said at least one translationally movable cowl is equipped with at least one locking means capable of cooperating with an additional locking means of said internal panel so as to mechanically link said internal panel to said at least one translationally movable cowl;
wherein the locking means and the additional locking means comprise at least one movably mounted ratchet compressed against an elastic return means, the at least one movably mounted ratchet capable of moving between an engagement position and a disengagement position, wherein in the engagement position, the at least one movably mounted ratchet firmly attaches said internal panel to said at least one translationally movable cowl to pivot said blocking flaps and in the disengagement position, the at least one movably mounted ratchet releases the internal panel from said at least one translationally movable cowl for a variable nozzle mode, the elastic return means tending to bring the at least one movably mounted ratchet back into said engagement position, said at least one movably mounted ratchet being maintained in the disengagement position via at least one pin mounted on a fixed structure of the thrust reverser, wherein in said variable nozzle mode, said at least one translationally movable cowl translates while said internal panel remains fixed.

2. The thrust reverser according to claim 1, wherein the at least one pin is movably mounted between a position for maintaining the at least one movably mounted ratchet and a set-back position, wherein the at least one pin passing from the position for maintaining the at least one movably mounted ratchet to the set-back position is combined with a situation of locking or unlocking of the at least one translationally movable cowl on the fixed structure.

3. The thrust reverser according to claim 1, characterized in that it comprises a means for detecting the end of closure of the at least one translationally movable cowl.

4. The thrust reverser according to claim 1, further comprising at least one single rod actuator cylinder having a first end mounted on the fixed structure and a second driving end linked to the variable nozzle section.

5. The thrust reverser according to claim 1, wherein the fixed structure on which the at least one pin is mounted, is a so-called twelve o'clock beam.

6. The thrust reverser according to claim 1, wherein the at least one translationally movable cowl is equipped with at least one locking means with a front frame.

7. The thrust reverser according to claim 1, the at least one locking means are located in a downstream portion of the at least one translationally movable cowl.

8. The thrust reverser according to claim 1, wherein the at least one locking means of the at least one translationally movable cowl and/or of the at least one variable nozzle section is mounted on a structure for guiding said at least one translationally movable cowl and/or the variable nozzle section.

9. The thrust reverser according to claim 8, wherein the at least one locking means comprises at least one jointed or sliding abutment, the at least one locking means being located substantially at a center of a section of a corresponding structure for guiding said at least one translationally movable cowl or the variable nozzle section.

10. A turbine engine nacelle comprising at least one thrust reverser according to claim 1.

* * * * *